United States Patent [19]
Thurman

[11] Patent Number: 4,706,198
[45] Date of Patent: Nov. 10, 1987

[54] COMPUTERIZED AIRSPACE CONTROL SYSTEM

[76] Inventor: Daniel M. Thurman, P.O. Box 457, Crested Butte, Colo. 81224

[21] Appl. No.: 707,859

[22] Filed: Mar. 4, 1985

[51] Int. Cl.$^4$ ............................................. G06F 15/48
[52] U.S. Cl. .................................... 364/439; 364/441; 364/461
[58] Field of Search ................ 364/439, 440, 441, 460, 364/461, 443, 444, 138, 424; 343/454, 456, 6.5 R, 5 G, 5 C; 340/907; 342/454, 456

[56] References Cited

U.S. PATENT DOCUMENTS

| | | | |
|---|---|---|---|
| 2,514,436 | 7/1950 | Alvarez | 364/439 X |
| 2,972,742 | 2/1961 | Ross | 364/439 |
| 3,159,831 | 12/1964 | Muth | 343/456 |
| 3,534,367 | 10/1970 | Laughlin et al. | 364/439 |
| 3,668,403 | 6/1972 | Meilander | 343/456 |
| 3,766,552 | 10/1973 | Hajduk | 343/456 |
| 3,868,497 | 2/1975 | Vietor | 364/440 |
| 4,196,474 | 4/1980 | Buchanan et al. | 364/461 |

Primary Examiner—Errol A. Krass
Assistant Examiner—Thomas G. Black
Attorney, Agent, or Firm—Richards, Harris, Medlock & Andrews

[57] ABSTRACT

A computerized system is provided for automated aircraft traffic control. The system includes a master control unit having stored information identifying and characterizing all aircraft flying in the controlled airspace. A plurality of regional control units are linked for communication with the master control unit. Airport terminal and enroute control stations in each region are linked to the regional control unit for that region. Each aircraft flying in the region is equipped with a data-link console for communication with the regional control unit. The aircraft data-link provides identification and flight condition data to the regional control unit, and the regional control unit provides weather data and guidance signals to the aircraft. The guidance signals guide each aircraft along flight paths formed by a plurality of airway grids disposed at fixed angles with respect to each other and at each of a plurality of flight levels. The system improves flight safety by guiding each aircraft along a flight path selected from a multitude of possible flight paths to ensure separation from other aircraft.

8 Claims, 8 Drawing Figures

COMPUTERIZED AIRSPACE CONTROL SYSTEM

ANGULAR SEPARATION = 22½°

COMPUTERIZED AIRSPACE CONTROL SYSTEM

TECHNICAL FIELD

This invention relates to automatic aircraft traffic control and, more particularly, to a system in which suitably distributed and programmed computers are responsive to all or a defined portion of a flight plan and to conditions encountered or developed to direct traffic from a departure airport to a destination, wherein air traffic lanes are used optimally by a data-link-terminal in each aircraft with two-way nonvoice communication means to respond to computer programs and data selectively received and employed in the course of flight.

BACKGROUND OF THE INVENTION

People everywhere seek to find solutions to existing problems in human cultures which have risen and fallen for many reasons. Most dominant among the reasons was how available technology was utilized.

The most significant pillars of progress were transportation and communication and how they were managed. From early times, these two areas of progress were not only significant but absolutely essential. Evidence of advancement, and periods of recession, can be historically tied to these two key forces.

As with any process, transportation and communication can be beneficially used or detrimentally misused. There is now a 200 year history of both in America. It has been very fortunate to date to have rapid development of new techniques and methods before the previous ones were rendered obsolete.

In the transportation field, rivers-canals, horse and buggy, railroads and motor vehicles were developed. Each has lost its place to some extent as a viable method of transportation for a variety of reasons—some realistic and some through abuse. Aviation, the most recent newcomer to the world of transportation, has also had its problems, but has prevailed so far in a vast variety of applications.

Aircraft traffic becomes more and more a problem of providing safety and economy. Efforts have been made to improve present air traffic controls as to quality. Such improvements have been accepted by many segments of the aviation industry. However, functional simplicity deemed essential to permit maximum advantage from use of highly technical options has left unanswered the need for systems capable of a higher desired level of operation. The ultimate goal of any air control system is the safe and efficient movement of aircraft from one station to another through airspace. As above noted, cooperation between the pilot and manual ground controllers becomes more and more demanding and places severe burdens on the pilot and the controller.

A partial list of those items that effect the air traffic control (ATC) systems directly includes the following tools and controls, which are listed in approximate chronological order of their development:

MAPS showing visual land features;
RADIO NAVIGATION, wherein early methods included:
  broadcast stations;
  low frequency homers; and
  low frequency A-N ranges.
RADIO COMMUNICATIONS including:
  low frequency;
  HF; and
  VHF.
GROUND CONTROLLERS, beginning about 1938 and including:
  ground radar from World War II;
RADIO NAVIGATION, considered to be a modern method including:
  ADF stations and equipment;
  Radar Ground Controller;
  VOR stations and equipment;
  DME stations and equipment;
  RNAV equipment;
  Inertial Navigation;
  Satellite Navigation;
  Radio Navigation Maps;
  Transponder used with ground radar; and
  Encoding Altimeter through use of a transponder.
PRECISION APPROACHES including:
  Radar approach Controller;
  Low Frequency Loop;
  ADF Automatic Direction Finder;
  Marker Beacon;
  VOR/DME or Visual Omni Range;
  ILS/GS or Instrument Landing System;
  Radio Altimeter;
  MLS or Micro-Wave Landing System; and
  Approach Maps and Plates.

Aviation has experienced very rapid growth since World War II and a vast expansion of applications as other transportation methods have become less desirable. Industries have exploded, both nationally and internationally. Today there are approximately 300,000 registered aircraft, of all types, in the U.S.A. alone. The high speed and all-weather use of many aircraft have compounded the problems of airspace use and of terminal facilities.

In 1938, the CAA started controlling airspace to provide aircraft separation, especially during instrument weather conditions. By 1950 the technology and procedures developed during World War II were available. Radio communications and radar are especially important. By the 1960's, the procedures for traffic control were entrenched so that subsequent technical advances were made to fit the existing mold. That is:

1. Pilot with his airborne equipment;
2. Ground controller with this radar scope, etc.;
3. A voice communication network between the two; and
4. All aircraft control programming passing through the Controller's mind for decision.

This is substantially where aviation is today. It has been asserted that the capacity of the present system is locked into a plateau by its basic design, that it cannot grow to any significant extent in its cumbersome ground-centered form. Further, radar-controlled-vector sequence, with its delays and uncertainties, produces a long, indirect loop from aircraft to radar to controller to computer to controller and back to aircraft. No amount of equipment updating will improve this basic concept of control to a useful level.

It may be said that the entire aviation community is held hostage to a ground-based empire, as it has been for more than the past decade. Future prospects envision more of the same, but with an ever increasing cost to the airplane owner for technical gadgetry to support existing systems, coupled with an aggressive training program to put more controllers in dark rooms to watch their tubes under inhuman pressure.

Current systems utilize omnirange/distance measuring equipment (VOR/DME) navigational aids.

Such systems are now in place throughout the United States and presently cover more areas than any other prior method. Aircraft operating in presently controlled airspace generally follow vector airways which concentrate traffic in certain areas while leaving vast voids of unused airspace. The airway folowed by a given aircraft is primarily dictated by travel between the departing aircraft origination airport and destination airport by way of these vector airways which create over-concentration at the various radio navigation aids.

DISCLOSURE OF THE INVENTION

The present invention involves eliminating the present vector airways network which overly concentrates traffic in certain areas while leaving vast voids of unused space. New airways are provided herein based upon a geometrical pattern of parallel paths corresponding to a grid of paths about twenty-five nautical miles apart with grid pattern established for each 22½° of heading and repeated at each flight level for both VFR and IFR operation.

In a more specific aspect, an automatic air traffic control system is provided wherein at least one master control is provided in an area to operate under the authority of this sytem. Each airport in the system is provided with an airport control program in the nearest region. A plurality of regional controls are fed by the master control. A console data link unit is provided in each aircraft to form data link capability with one or more of the regional control systems and, therethrough, to any selected airport control operation. Airports in the system are provided with an airport controller as a part of the regional control. The aircraft data link console provides for automatic nonvoice communication with regional computer(s) on the ground. As a part of the aircraft unit, the data console utilizes nonvoice operation except on emergency standby.

More particularly, the master control provides means for a radio, or land line data link to one or more regional control units as well as to one or more airport control units.

Each aircraft includes a means for automatically establishing a data-link with the response from region control for take off and landing and for directing the aircraft while in flight onto one of a set of flight paths that are geographically oriented each 22½° of compass directions and each flight path trajectory repeated in parallel about every twenty-five nautical miles apart at one level and with the trajectory pattern repeated at each of a plurality of elevations above the ground, and extending to the upper elevations of the control system.

In operation, an aircraft at a departure airport sends a requested flight plan to the regional center and receives back a clearance plan from the computer control program defining a flight path from the point of departure to the destination airport with all aspects of the flight specified by the programmed computer, including on-file data for that specific aircraft, via regional controls. Master control supplies stored data for access by the region control as required by the data-link terminal console carried by the aircraft.

Thus included in the aircraft is a data-link-terminal with means for operating upon a computer program with the navigational data required for flight path calculations including (a) latitude, (b) longitude and (c) altitude.

More particularly there is provided an aircraft flight control system which includes a plurality of region control units located at spaced ground points in an area of air traffic. Each region control unit has access to aircraft guidance and operation data for applying coordinate guidance signals to fly the aircraft through said area along paths characterized by orientations parallel at each of a plurality elevations where said paths at one elevation are at the same fixed rotational increment in relation to other paths. A master control is linked to each region control unit for transfer of flight and operation data therein from one region to another. A linkage is provided from one region control unit to one of the aircraft in the region to fly each aircraft by said coordinate guidance signals along such paths.

DETAILED DESCRIPTION

Figure 1:
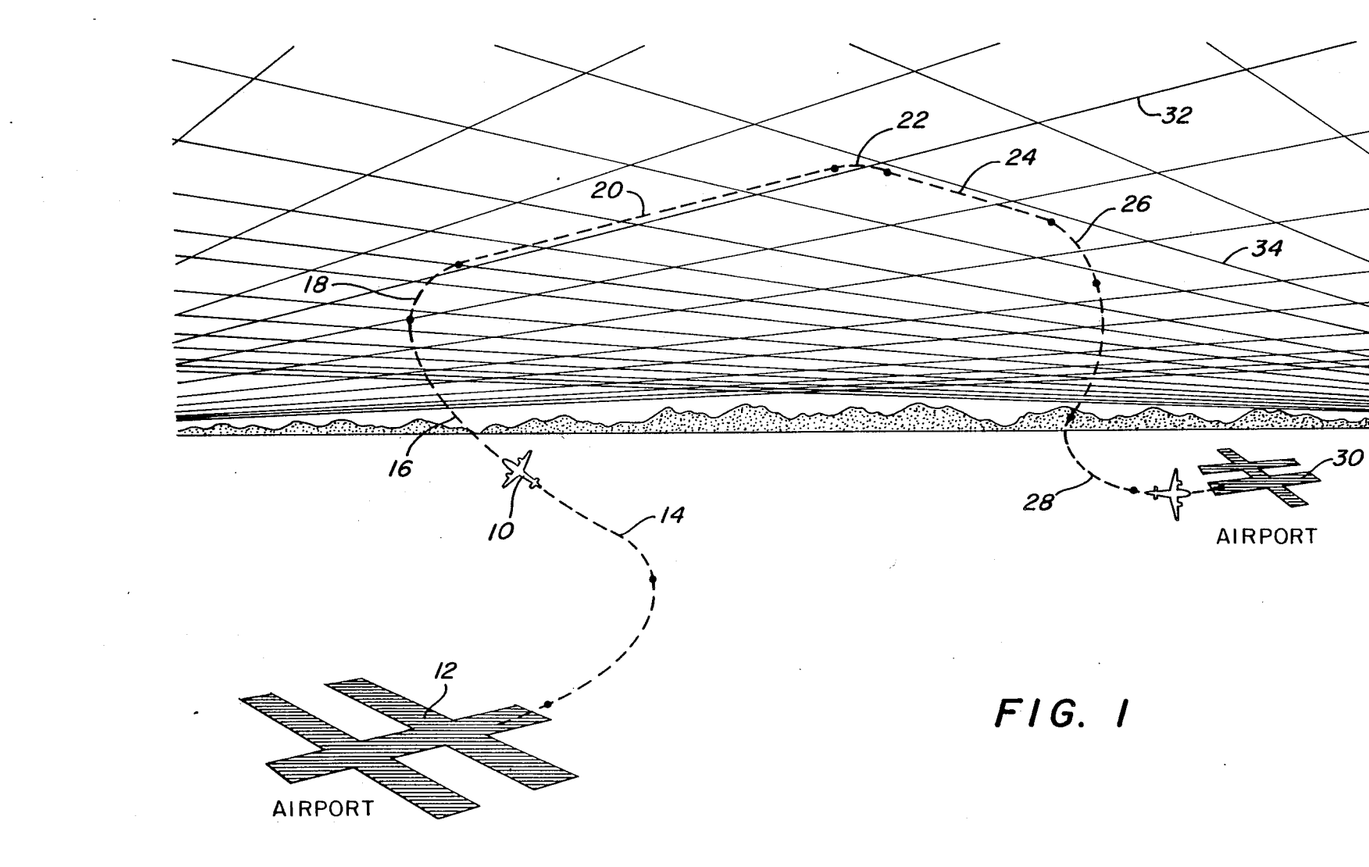
FIG. 1 is a view of paths followed by an aircraft in transit from a departure to a destination airport.

FIG. 1 illustrates operation of an aircraft 10 as it takes off from airport 12 along departure path 14. The aircraft 10 climbs toward its intended flight altitude over a path 16. The aircraft is then directed to turn in path 18 as to follow thereafter the main path 20 of the journey along an airway 32. From the airway 32 the aircraft is directed to turn in sector 22 to path 24 in which it runs parallel to airway 34. Thereafter in path 26 a turn is made towards the path 28 that leads to the airport 30.

It will be noted that both of the straight airways 32 and 34 are routed between airport 12 and airport 30 as to involve operations of guidance of the aircraft to limit the path to airways which are fixed in space and correspond to one or more of paths which extend north, north northeast, northeast, east northeast, east, east southeast, southeast, south southeast, south, south soutwest, southwest south, west, west northwest, northwest, north northwest, namely, the sixteen points of the compass thereby identifying sixteen directions available to chart the course from airport 12 to airport 30.

Figure 3:
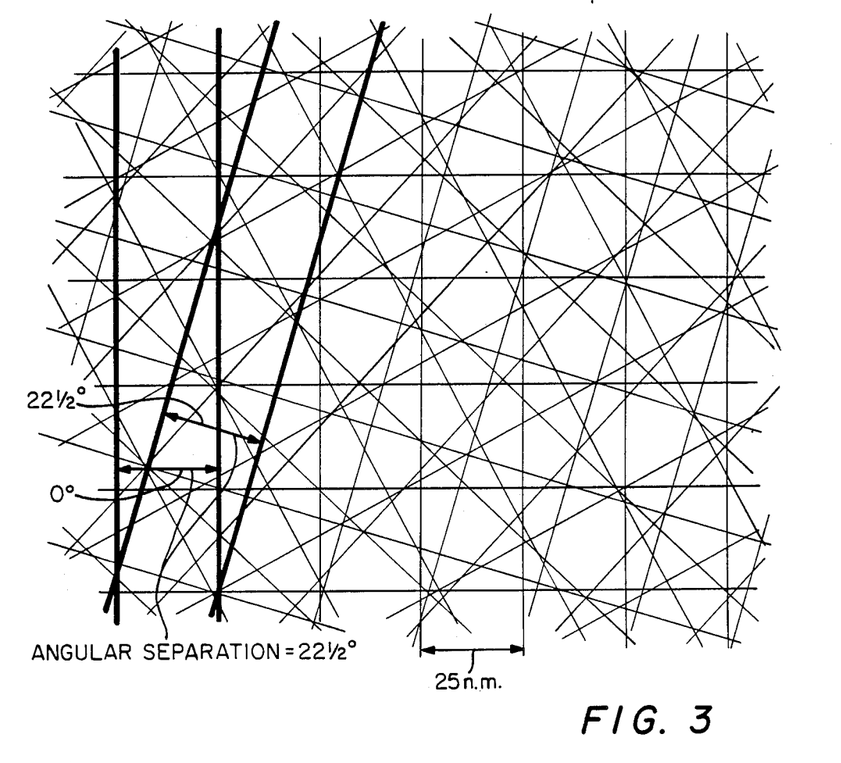
FIG. 3 illustrates a 22½° grid representing airlanes in accordance with the present invention.

As shown in FIG. 3, these airways are geographically fixed by latitude and longitude within the control area and exactly repeated at about each 500 foot flight level. The airways have angular relationship, one to another, each 22½° throughout the compass making a total of sixteen available headings. Each airway is repeated in parallel spaced apart for example about twenty-five nautical miles.

Figure 4:
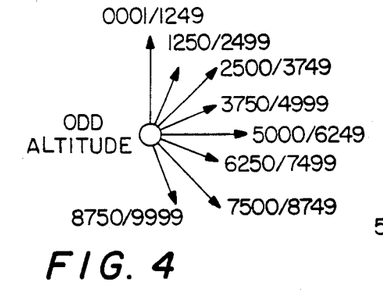
FIG. 4 illustrates airlane numbers for odd altitudes.

With reference to FIG. 3, odd altitude flight levels are limited to those airways having headings between 0° (360°) and 179° numbering 8 in all being N, NNE, NE, ENE, E, ESE, SE, and SSE. All airways have specific assigned numbers consecutively arranged for each heading group. For instance, the numbers 0001 through 1249 would provide enough data to serialize the airways having a N (north) heading, numbers 1250 through 2499 for NNE, etc. With reference to FIG. 4, even altitude flight levels are limited to those airways having headings between 180° and 359° numbering 8 in all being S, SSW, SW, WSW, W, WNW, NW, and NNW. These airways carry the same number as its reciprocal odd airway in FIG. 3

In accordance with this invention, aircraft are controlled by computers which are programmed to utilize coordinate signals to fly the aircraft along one of the airways of FIG. 3.

Figure 2:
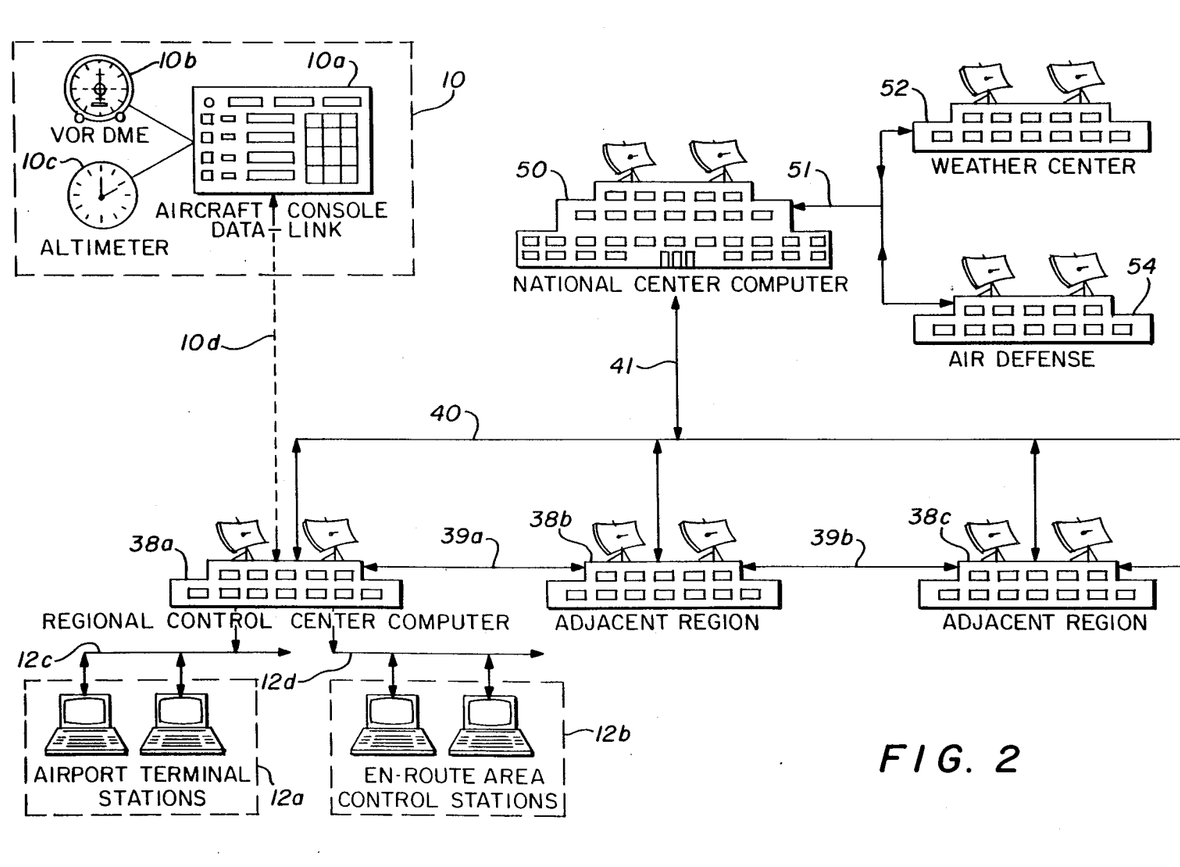
FIG. 2 is a block diagram of the aircraft control system of the present invention.

Referring to FIG. 2, a system embodying the present invention is shown in block form. Included is an aircraft console 10a, a VOR/DME unit 10b, and an altimeter 10c. Aircraft 10 is coupled by way of a communication data-link 10d to a regional control center computer 38a. Link 10d leads to regional control center computer 38a which communicates with the aircraft console 10a.

The regional control center computer 38a includes communication paths 12c, 12d leading to airport terminal stations 12a and enroute area control stations 12b, respectively.

Regional control center computer 38a is coupled by way of linkage 39a to an adjacent regional computer 38b and then to a regional computer 38c, the latter being by way of linkage 39b. Each of the regional installations 38a, 38b and 38c are provided with communication dishes for handling the data channels indicated.

Regional center 38a is coupled by way of linkage 40 and 41 to a national center computer 50. Computer 50 is connected by way of linkage 51 leading from a weather center 52 and from an air defense center 54 so that the operations of the national center computer can include weather and defense data. The center 50 is provided with dishes for communicating along the path 41 to several of the regional control center computers and the airport terminal.

Referring to FIG. 1, the operation of the system is such that, all aircraft would be directed to follow one of the grid paths indicated in FIG. 3 under the control of regional control center computer 38a.

National center computer 50 is a principal source of data for operation of the system. All of the data necesary to identify the aircrafts in the area within national boundaries, are stored in retrievable form in center 50. Center 50 is linked by channel 41 effectively to all of the regional control center computers such as regional computers 38a, 38b and 38c. Channel 41 is either a microwave or ground line.

Regional control center installations serve as a conduit from center 50 to airport terminals such as 12a. Regional control unit 38a serves to acquire data from unit 50 and apply that data through link 10d to aircraft 10. Each airport such as airports 12 and 30 of FIG. 1 communicates with the system by way of airport terminal stations 12a. The regional control center installations 38a, 38b and 38c cooperate for guidance of the aircraft and acquire data for operation from the computer system 50.

In accordance with the invention, each aircraft taking off from an airport within the system would, upon reaching a selectable altitude, be called to respond to a program employed in regional control center 38a to apply data from center 50 to cause aircraft 10 to ascend to and follow along the sector 20 of its course and turn to sector 24 and then along legs 26 and 28 to airport 30 where any one of several known landing procedures may be followed, including instrument landing.

The airway indicated by lines 32 and line 34 are geographically fixed by latitude and longitude within the control area and are exactly repeated at each applied level. Paths 32 and 34, etc. have angular relationship one to another each $22\frac{1}{2}°$ throughout the compass making the total of sixteen available headings above enumerated. Each of the sixteen air lanes is repeated in parallel about every twenty-five nautical miles apart. With reference to altitude, the easterly odd flights paths are limited to air lanes having headings between 360° (000°) and 179°. All airways have specific assigned numbers consecutively arranged for each heading group. For instance, in FIG. 4, the number 0001 through the number 1249 should identify the airways having a an northheading, numbers 1250 through 2499 for north northeast, etc.

The pattern of FIG. 1 may represent the grid of paths at one level, it being understood that aircraft at any one of several different flight altitudes may be directed to follow airways which are limited to the grid itself. Thus the airways shown in FIG. 3, are limited to $22\frac{1}{2}°$ paths. It will be appreciated that if finer detail is required, an additional set of grid paths would be employed to define the area represented in FIG. 1 by establishing additional grid paths as indicated in FIG. 3.

Figure 5:
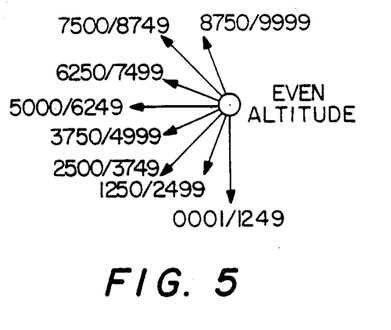
FIG. 5 illustrates airlane numbers for even altitudes.

Flights following even altitude flight levels would be limited to those airways having headings between 180° and 359°. Such paths have the same numbers as their reciprocal odd path numbers, as shown in FIG. 5.

The national center computer 50 may constitute a single center which serves as a data bank for each of the regional controls 38a, 38b and 38c.

Region controls 38a, 38b, 38c are the only source of contact with aircraft within the region. A region computer does not store individual aircraft data or national weather data. It acquires this data from the master control when needed. The region control acquires data to:

1. Identify all airways within the region in terms of coordinate geometry programming;
2. Provide data/link communication ability;
3. Identify all navigational stations within the region with reference to the airways;
4. Identify all airports with reference to the airways;
5. Utilize all airport arrival-departure programs for the airport terminal traffic handling on each airport within the region;
6. Use a series of enroute controller terminals;
7. Use a series of airport controller terminals;
8. Program radar stations within the region;
9. Query one or more adjacent region computers to plot a purposed flight all the way from take off to its destination;
10. Use a computer program to control all aircraft within the region; and
11. Insert regional weather into the computer program.

Thus it will be understood that the regional computers 38a, 38b and 38c are each very large and perform key functions in the entire system. All other components of the system, including the aircraft data/link terminal, the master control, the adjacent regions, enroute controller stations, airport controller stations, and other data sources, feed the regional computer information and in turn receive information from the regional computer.

Further, in accordance with the present invention there are two options to the system:

A. An autopilot interface to the regional control center 38a which causes the aircraft to follow the computer generated airways; and B. An accessory cathode ray tube display screen with controls to enable the pilot to receive additional data from the computer 38a, such as pictorial weather display, other traffic display, departure/arrival airport display with real-time traffic, weather forecast and sequence, etc.

It will be recognized that satellite communications for region to aircraft contact could be employed so as to avoid any blank spots in aircrafts location. This would not require a change of any of the system except for antenna network on the ground.

Figure 6:
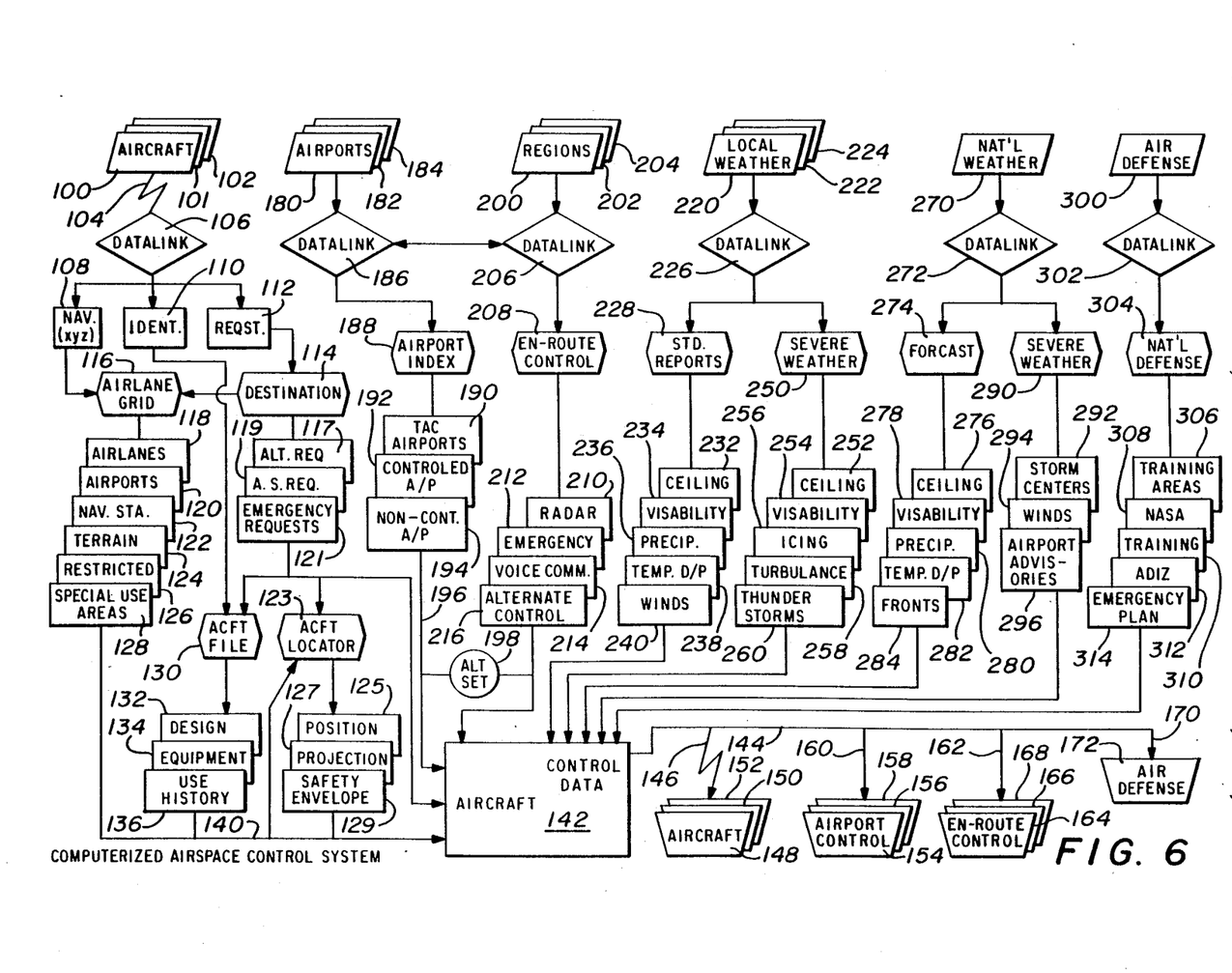
FIG. 6 is a data flow chart of the program involved in carrying out the present invention.

Referring to FIG. 6, a flow chart is shown wherein one or more aircraft may be involved in the guidance operation. Aircraft units 100–102 are shown as coupled by communication channel 104 to regional data link receiver 106.

The output channels from the data link 106 lead to the navigation unit 108 which provides XYZ data, i.e. latitude, longitude, and altitude, respectively.

The aircraft identification is provided by unit 110. Requests for data from the aircraft by way of pilot or otherwise is accomodated in unit 112. The intended destination is stored by unit 114 and is combined in the air lane grid generator unit 116. The output of the unit 116 is then provided to airway data in unit 118, in unit 120 to airports, and in unit 122 to navigation stations.

In unit 124 terrain data is provided. Terrain problems of significance are utilized in 124.

Restrictions on the intended airway are provided by unit 126. Special use areas are provided by unit 128.

From the aircraft file the identification of the aircraft is supplied in unit 130. Any data necessary to note for the aircraft design 132, the equipment design 134, and the use history 136 are then combined on channel 140.

Channel 140 leads to the storage of aircraft control data unit 142. Aircraft channel 144 is coupled by channel 146 to one or more aircraft units, only three being shown, namely aircraft 148, 150 and 152.

Airport control data is provided from storage units 154, 156, 158. Enroute control data is similarly provided by way of channel 162 to handle control units 164, 166 and 168. Finally by way of linkage 170, air defense data air control signals are provided to the air defense unit 172.

At this point it will be noted that the six stations at the top of FIG. 6 provide data sources with respect to which the aircraft 148–152 will be guided as they traverse the airways from a departure airport to a destination airport. That is, the airport units 180–184 are coupled by data link unit 186 to an airport index unit 188. Included in such information is terminal area control (TAC) airport units 190, controlled airport units 192, and noncontrolled airport units 194. Data linkage 196 is acquired by the master control 142. Altitude at the departure airport is made of record in the system through the altimeter set unit 198.

The regions 200, 202 and 204, upon request, supply the data link 206 the data to be utilized in operation of the aircraft 100–102. The data in the data link 206 is applied to an enroute controller 208. Radar data is supplied from unit 210. Emergency data is supplied from unit 212. Voice command channel 214 and alternate control unit 216 provide information and control data through the central unit 142.

Local weather is supplied from several stations 220, 222, 224 with standard reports from station 228 and severe weather from station 250. The weather reports provide information as to the ceiling in unit 232. Visibility data is provided in unit 234, precipitation in unit 236, temperature in unit 238, and wind velocity and direction in unit 240.

Severe weather data is provided to unit 250. The ceiling is identified by data in unit 252, visibility in unit 254, icing conditions in unit 256, turbulence, if any, in unit 258, and thunderstorms in unit 260.

National weather conditions are provided by unit 270 which feeds data link 272 and events forecast unit 274. Ceiling data is provided in unit 276, visibility in unit 278, precipitation in unit 280, temperature in unit 282 and cold fronts in unit 284. This data is then available to aircraft 148–152 through unit 142.

Severe weather information stored in unit 290 involves identification of storm centers in unit 292. Wind conditions are indicated by unit 294; airport advisory information is provided from unit 296.

Air defense data is available from the source 300 by way of data link 302 and is available to the aircraft 148–152 in terms of national defense information in unit 304, training areas in 306, NASA activities in 308, training activities in 310, ADIZ in 312, and emergency plans in 314.

The destination data 114 includes altitude data requested in unit 117, air speed requested in unit 119, emergency requests in unit 121. The aircraft locator unit 123 provides position data in unit 125, a projection of that data in unit 127, and data for safety envelope in unit 129.

With the foregoing data in units 100, 180, 200, 220, 270 and 300, aircraft 100 could fly from an origination airport and, through operation of the limits placed in the system in FIG. 6, could fly to and remain on one of the airways shown in FIG. 2 while maintaining a safe distance from any other aircraft and reach a destination with very little if any deviation.

As noted in FIG. 6, the following abbreviations and acronyms are utilized:

XYZ=latitude, longitude, and altitude;
A/S=aircraft airspeed;
ALT. SET=pressure altimeter setting;
TAC=airport terminal area control;
ADIZ=air defense zones.

Figure 7:
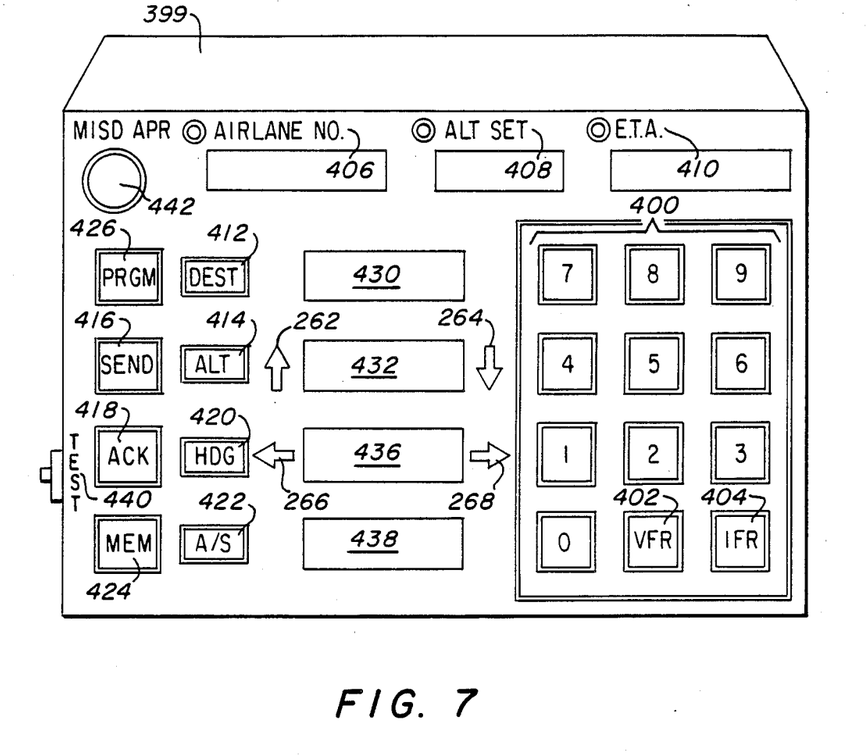
FIG. 7 illustrates an aircraft data link console employed in the present invention.

Referring to FIG. 7, one form of the data link console 399 is illustrated. Included is a keyboard 400, a VFR command input 402, and an IFR command input 404. By way of further information, the console indicates the airlane number in the display bar 406, the altimeter setting in bar 408, and the estimated time of arrival in bar 410. Display panels 430–438 are utilized in connection with the displays presented to the pilot as he follows the route directed by the program and the data of FIG. 6. Operation of the console 399 is described in detail below.

Figure 8:
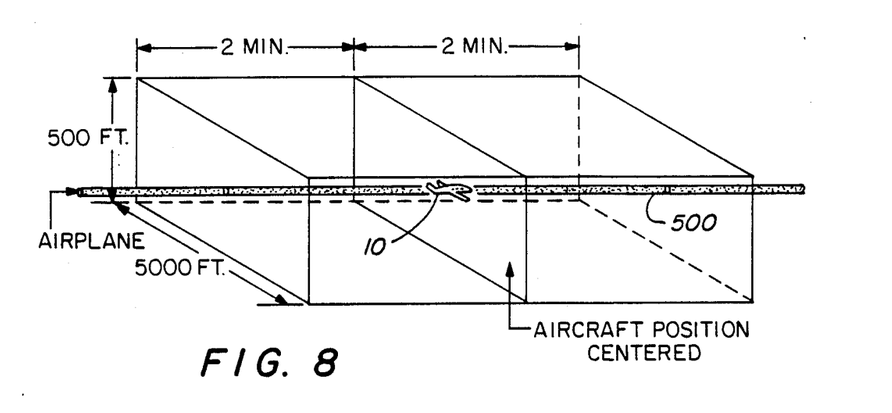
FIG. 8 illustrates an air corridor envelope for each aircraft.

Referring now to FIG. 8, there is illustrated a computer safety envelope for air traffic control. The specific envelope shown in FIG. 8 is provided for in the controls indicated above in connection with FIGS. 6 and 7. In this space, aircraft 10 flies airway 500 while centered in a safety envelope which is 500 feet high, 5000 feet wide, two minutes trailing the aircraft, and two minutes leading the aircraft so that collison with other aircraft is avoided. The computer serves to schedule and project flight paths for such envelope separation.

As shown in FIG. 3, a set of airways is represented by the grid lines. In the lower left hand corner the 0° path is spanned by the 0° arrow. Immediately above, there is indicated the +22½° path. Similarly paths at 45°, 67½°, and 90° are provided to form the entire network.

It will be understood that one of such arrays is repeated every twenty-five nautical miles and that the airways corresponding to occasions shown as shown in FIG. 3 are provided at each at level.

Referring again to FIG. 7, the keyboard 400:
1. Contains Digets 0 thru 9;
2. Contains "VFR" button 402 and "IFR" button 404;
3. Is used to key in "Flight Plan" and subsequent changes;
4. Is used to key in "E.T.A", if desired;
5. Is used to key in "Alternate" when needed;
6. Is used to key in "Departure" airport when necessary;
7. Is used for alpha characters when keying in "Destination" or "Departure" airport identifier (i.e. 01 for A, 02 for B, 26 for Z, etc.); and
8. Is functional only when in the "Program" mode.

Typical keyboard sequence:
1. Aircraft master switch "On";
2. Console/terminal queries computer on pre-set frequency and computer responds. Response is indicated by;
   (a) "ALT.SET" window 408 displays local altimeter setting;
   (b) Top row LCD windows 430 display airport identifier;
   (c) "Program" button 426 lights with steady light;
   (d) If above readings are not present, console 399 is either not operative or aircraft is in a location unable to establish data-link radio contact;
   (e) To test console 399, press test button 440; a fully operative console will display "PRGM" button steady plus all four anti-collision arrows 262, 264, 266, and 268 on steady.
3. If airport identifier is incorrect, enter the correct identifier. If error is made, press "DEST": button 412 to zero entry and start over.
4. With departure airport identifier displayed, press "VFR" button 402 or "IFR" button 404. Button will display steady light. To correct error, press button again to cancel. The completion of this function sets up the console/terminal 399 to start receiving the "Flight Plan" sequence.
5. At this time, press "DEST" to key in flight clearance. Button 412 will display steady light while destination identifier is entered. To correct error, press "DEST" button to zero, then proceed.
6. With destination identifier displayed, press "ALT" button 414. The "DEST" button 412 will go out and the "ALT" button 414 will light up steady. Select desired cruise altitude using three digit method; 165=16,500 FT., 260=26,000 FT., 075=7,500 FT., etc.
7. With selected cruise altitude displayed, press "HDG" button 420. "ALT" button 414 will go off and "HDG" button 420 will light steady. At this time enter take-off runway, if known; otherwise leave blank and proceed with next step. Ground controller will key the heading in when taxi insructions are issued for the appropriate runway. The computer will always communicate in magnetic heading.
8. Next, press "A/S" button 422 and enter desired indicated cruise airspeed. This is the indicated airspeed you wish to cruise at when leveling off at altitude. The computer will automatically calculate your true airspeed and effective ground speed but will always communicate to the console 399 in 'indicated airspeed'.
9. All fourth rows 430–438 should now read the desired flight plan and the correct VFR or IFR button should be lit.
10. E.T..A. mode 410 should only be used if the arrival time is substantially important. If E.T.A. is selected, the computer will make adjustments during flight in airspeed and/or altitude in atempting to cause touch-down at destination to fit selection, if possible.

To select E.T.A., press button next to E.T.A. window 410 and key in desired E.T.A. in 24 hour method using Zulu time. The window 410 will always display the selected E.T.A. until the election is to cancel it. If computer determines that the selected E.T.A. cannot practically be met, it will display a new E.T.A. and request acknowledgment.

Filing a flight plan and computer response:
1. With the entire flight plan displayed, press the send button 416 to file it with the computer.
2. The SEND button light 416 will go steady and the "PRGM" button light 416 will go out.
3. When the computer digests the flight plan (in seconds), it will communicate back a clearance in the display windows and the SEND button 416 will go out leaving a flashing "ACK" button 418. In the display window 430 one will always read destination identifier unless that airport is closed. The window 436 will show initial heading clearance after take-off. The window 438 will show the cleared indicated airspeed, and the window 432 will show the cleared cruise altitude.
4. Also displayed in the window 402 at this time will be the take-off runway if on a controlled airport. Otherwise, the window 402 will display the first "Airlane" number you will be vectored to.
5. If clearance is satisfactory, press the "ACK" button 418 and proceed with ground taxi procedure to the active runway as directed.
6. Once clearance has been acknowledged, it can only be erased by the pilot by re-programming a change and re-submitting it to the computer for approval. The last approved and acknowledged clearance will remain in the console memory bank or on display until flight is completed.
7. After take-off, the computer will direct the aircraft with heading, altitude, and airspeed changes to accomplish the flight clearance. Each computer change enroute will be accompanied by a flashing "ACK" button 418 requiring pilot acknowledgement. Changes in altitude and/or heading will also be accompanied by a steady directional arrow 262, 264, 266, or 268 until acknowledged.
8. Any computer instigated changes in Airlane No., Alt. Set, or E.T.A. will be accompanied by a flashing "ACK" button 418 together with the subject light.
9. Upon approaching destination the computer will start the let-down sequence in the same manner as enroute changes. When leaving the last grid airlane during the airport approach, the computer will change the airlane window 406 to read the Landing runway identifier; i.e., 17R for runway 17 right, etc., together with a flashing "ACK" button 418.

10. During the approach to landing phase, the computer has been programed to provide a "safe" corridor all the way to the runway threshold including the correct runway for the type aircraft and sequencing with other aircraft both landing and taking off. Speed control and routing is used to stage aircraft separation while maintaining as rapid pacing as conditions and traffic density will safely permit at that airport facility.

11. "Go-Around" or "Missed Approach" may be elected by the pilot at any time during the entire approach procedure by merely pressing the "M/A" button 442 and following the computer instructions. The "M/A" button 442 will then stay lit until pilot acknowledges the instructions.

12. The computer may also direct a "Missed Approach" for various reasons including aircraft deviation beyond the safe approach corridor limits. In this case the "M/A" button 442 will go to flashing, the "Up" arrow 262 will go on steady, an alarm horn will sound pulsing, the appropriate heading and new altitude clearance will display, and the "ACK" button 418 will flash requiring pilot response.

13. "Alternate" airport may be selected by the pilot at any time following depression of the "M/A" button 442 by selecting "PRGM" function 426, then "Dest" button 412, and keying in the alternate airport identifier letters. Pilot can either select his altitude and/or airspeed or let the computer select the "best route" using the aircraft file data. Computer may also direct an "alternate" airport in case of airport closed due to surface problems or extreme adverse weather for that type aircraft. In any case, fuel reserves will be presumed as standard or better. If desired, pilot may have the computer select the alternate for him by keying in a "000" in the "Dest" window 430 and computer will pick the closest qualified airport commensurate with the aircraft type, equipment on board and existing conditions.

14. On an approach to landing, the approach controller will clear the aircraft to land by voice command only. Aircraft will not be cleared to proceed below minimums on a controlled airport until the controller receives clearance to land. Computer clearance will cancel automatically when aircraft lands and speed falls below go-around option.

15. All airborne emergencies initiated by the pilot will be done by contacting the controller on the assigned listening watch frequency and following emergency procedure thereafter. The controller may elect to handle aircraft totally by voice or a combination of computer program and voice until emergency is finalized.

Collision Avoidance:

1. Emergency collision avoidance feature of the computer program is designed to keep the "safety envelope" surrounding each aircraft from overlapping that of another. The computer activates the avoidance system and instructs the pilot to take rapid evasive action as follows:
   (a) The appropriate arrow(s) 262, 264, 266, 268 will go to flashing.
   (b) The new heading 436 and/or altitude 432 will appear.
   (c) The alarm horn will sound pulsating.
   (d) The "ACK" button 418 will light flashing.
2. When emergency is terminated, computer will re-direct aircraft back on course.

Safety Envelope:

1. The computer programmed units keep the aircraft in the center of its clearance route and on altitude. Surrounding the aircraft is a box-shaped envelope 500 ft. high, 5000 ft. wide, 2 minutes in front of and 2 minutes behind the aircraft as shown in FIG. 8.
2. The computer will direct the aircraft always to be near the center of this envelope and will direct the envelope limits along the flight path so as to avoid all other envelopes. By the inherent capacity of the computer, this will be done by advance time projection thereby avoiding most last minute corrections.
3. Small corrections will be made continuously for minor aircraft deviations, with appropriate console displays and acknowledgements. If aircraft wanders to edge of envelope the computer will sound the alarm horn and the controller will initiate voice communication to determine the problem, if any.

Severe Weather:

1. Weather will be programmed into the computer on a national and local basis with continual updating.
2. Severe weather in the form of storm cells, severe turbulance, icing, low ceilings, and air shear will cause the computer to deviate aircraft enroute according to aircraft type and equipment on board as filed with the central computer data bank.
3. Pilot may elect to change heading-altitude-airspeed at any time by using the "PRGM" function 426 and requesting a deviation in clearance. Pilot can return to original computer clearance after the deviation by pressing the "MEM" button 424 and the "SEND" button 416. As this is the only circumstance the pilot would select a 'heading change', the computer will recognize it as a temporary route deviation and retain the original route in memory for later recapture.

Navigation:

1. The aircraft console 399 has provisions for radio (VOR/DME) input and encoding altimeter input. The pilot must always have the primary navigation radio tuned to a usable signal on any VOR NAV station. The automatic data-link contact with the computer each second will provide the computer with the necessary data to continuously plot the aircraft x-y-z position and also derive the speed, heading, and rate of altitude change.
2. The computer will ignore the few seconds it takes to change navigation station frequencies and start computation only when it reads a clear identifier and a steady radial/DME signal. The computer also ignores the secondary use for which the pilot may be using the signal, such as OBS needle or RNAV function.
3. The computer has the area radar blip of the aircraft making a continuous cross-check on the accuracy of the VOR/DME information and, where a conflict appears, will alert the controller for appropriate action.
4. During the final approach to the destination airport, the pilot will be notified by the approach controller somewhere outside the outer marker when to switch to the appropriate ILS frequency. The computer will then use the area radar blip in conjunction with time/speed calculations to determine distance from threshhold and the ILS/GS signal for accurate alignment along the final approach corridor to touch-down point. Back course approaches will follow same procedure but without the glide slope data.

5. At all times, regardless of flight plan type, the pilot will be assigned a listening watch frequency for immediate contact with the appropriate controller monitoring the traffic for that area. The controller will have a video display as well as a radar display of all traffic and appropriate other equipment to completely monitor the computer control program or intercede as required.

What is claimed is:

1. An aircraft flight control system comprising:
   (a) a plurality of region control units located at spaced ground points for controlling aircraft flying through regions of airspace;
   (b) a master control unit linked to each of said plurality of region control units for transferring flight and operation data from one region control unit to another; and
   (c) a linkage from each of said region control units to each of said aircraft in said region for transferring flight data and guidance signals to control flight of said aircraft through said region along paths formed by grids of airways disposed at fixed angles with respect to each other and at each of a plurality of flight levels.

2. An aircraft control system which comprises:
   (a) a plurality of regional control units located in airspace regions having airways and airports, said regional control units providing computer directed guidance signals to direct aircraft flying through said regions to fly along compass point paths including north/south, east/west, northeast/southwest, northwest/southeast;
   (b) a master flight control unit linked to each of said regional control units, comprising:
      i. a master file of all registered aircraft, including identifier codes and flight characteristics;
      ii. means for disseminating weather data to each of said regional control centers;
      iii. a national air defense data link to enable emergency aircraft guidance operations;
   (c) an airport control unit at each of said airports linked to its regional control unit for exchanging aircraft control data with said regional control unit; and
   (d) a data link unit in each aircraft for responding to said guidance signals for flight along said airways comprising one or more of said compass point paths.

3. An aircraft flight control system which includes a plurality of regional control units located at spaced ground points in predefined airspace regions, comprising:
   (a) means in each regional control unit for accessing aircraft guidance and operation data and for applying coordinate guidance signals to aircraft flying through said region to guide said aircraft along paths in a grid of intersecting airlanes;
   (b) means for linking said plurality of regional control units for transfer of flight and operation data from one regional control unit to another; and
   (c) linkage from each of said regional control units to each of said aircraft in the region to fly each of said aircraft by said coordinate guidance signals primarily along said paths.

4. An aircraft flight control system which includes a plurality of region control units located at spaced ground points in regions of air traffic, wherein each region control unit has access to aircraft identification and operation data, the combination comprising:
   (a) means for generating coordinate guidance signals to guide aircraft through said region along paths formed by a plurality of airway grids disposed at fixed angles with respect to each other and at each of a plurality of flight levels;
   (b) a master control unit linked to each of said region control units for the transfer of identification and operation data from one region to another; and
   (c) a linkage from each region control unit to each aircraft in the region to fly each aircraft by said coordinate guidance signals along said paths.

5. An aircraft guidance method which comprises:
   (a) storing data uniquely identifying and characterizing each aircraft which may fly through an airspace region;
   (b) storing, on a real time basis, data representing flight conditions existing in said airspace region;
   (c) transferring said flight condition and aircraft data between said aircraft and a regional control unit; and
   (d) guiding transit of said aircraft through said airspace region in response to said flight conditions along airways which are defined by a plurality of grids angularly disposed at a fixed angle and available at a plurality of vertically spaced flight levels.

6. The method set forth in claim 5 wherein said fixed angle is $22\frac{1}{2}°$.

7. The method set forth in claim 5 wherein each of said grids comprises airways spaced apart by approximately twenty-five nautical miles.

8. The method according to claim 5, further comprising:
   (e) defining a safety envelope around each of said aircraft;
   (f) determining from said flight condition data the occurrence of overlapping safety envelopes of two of said aircraft; and
   (g) providing guidance data and a warning from said regional control unit to said two aircraft to avoid collision.

* * * * *